Aug. 4, 1925.
C. E. DAVIS
1,548,664
SELF PROPELLED VEHICLE
Filed Dec. 29, 1920
5 Sheets-Sheet 2
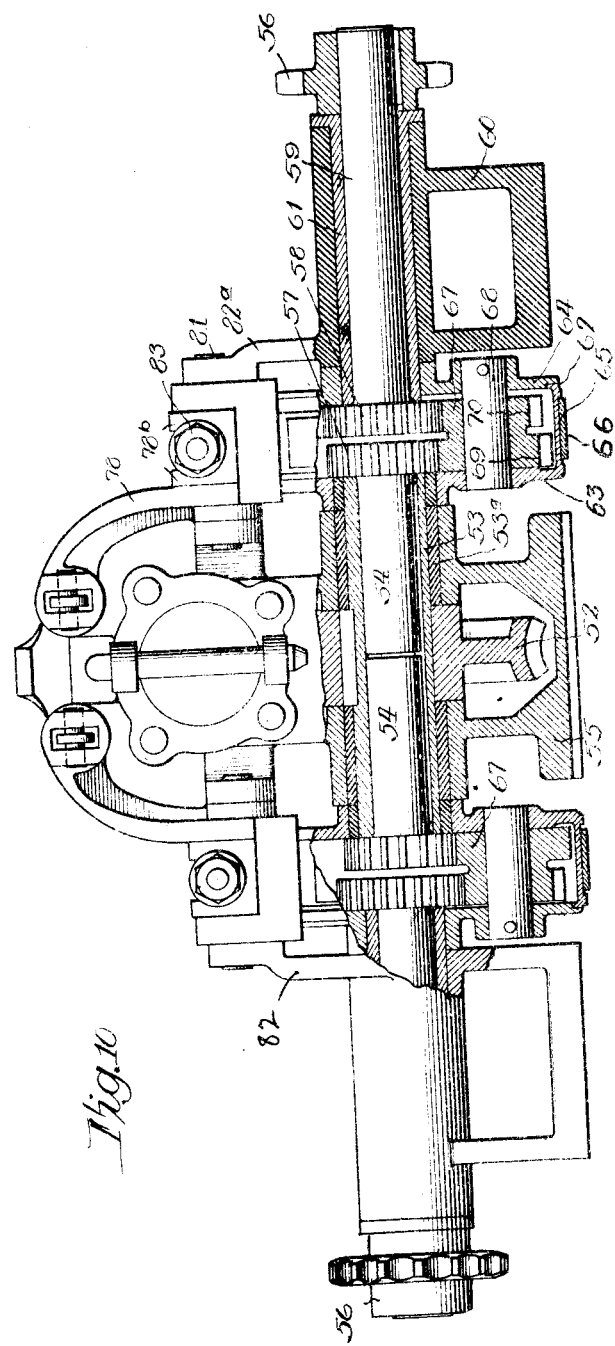
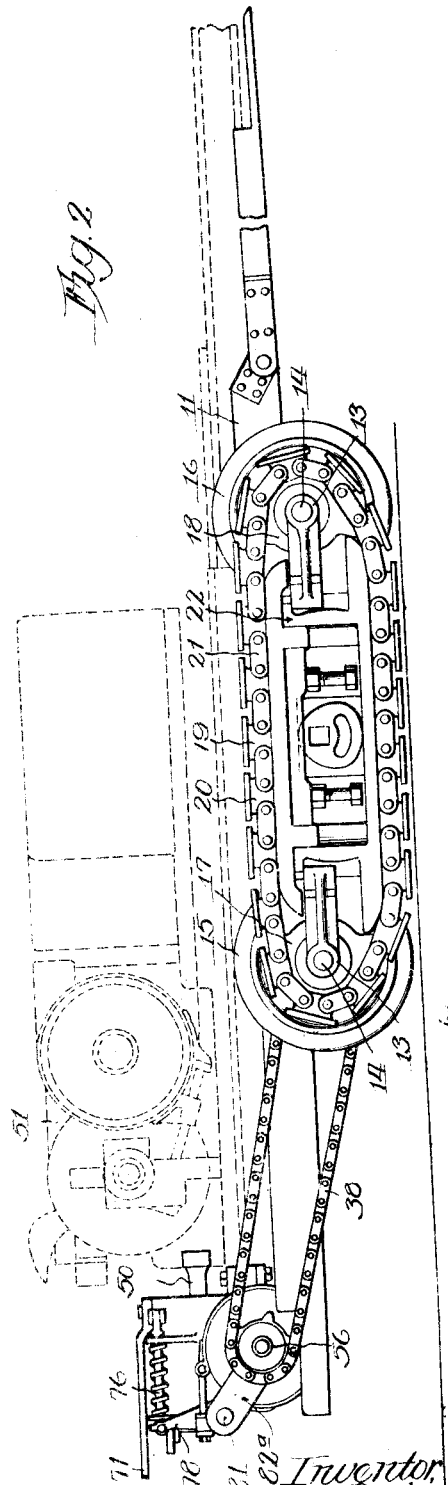
Inventor
Chas. E. Davis.
By Clarence F. Poole Atty

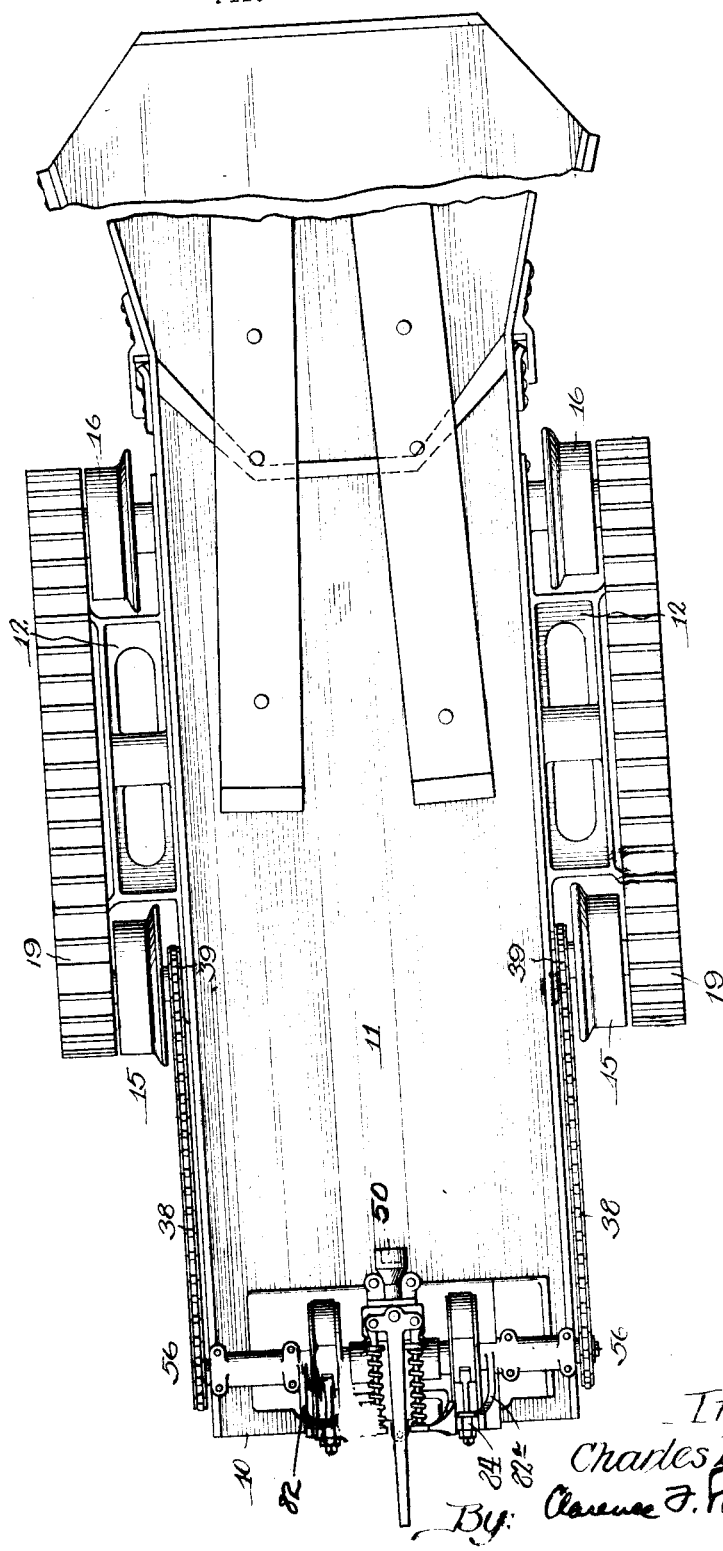

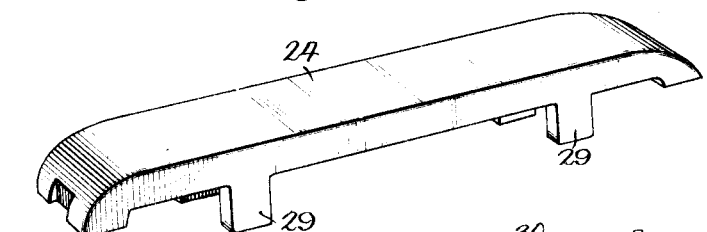
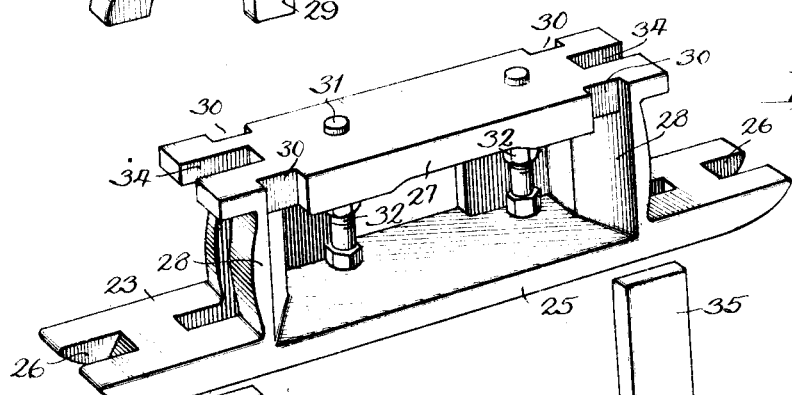
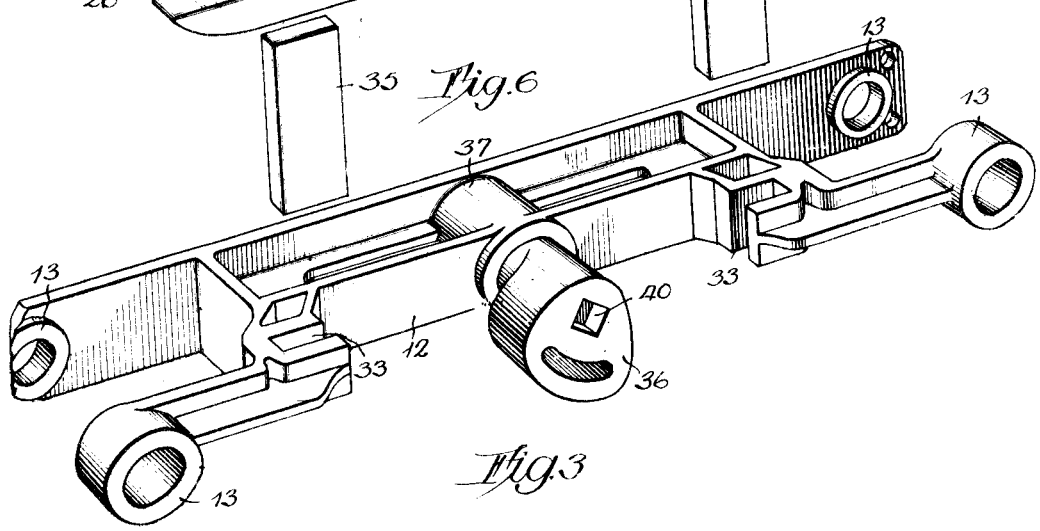

Aug. 4, 1925.

C. E. DAVIS 1,548,664

SELF PROPELLED VEHICLE

Filed Dec. 29, 1920  5 Sheets-Sheet 4

Inventor,
Charles E. Davis,
By Clarence F. Poole Atty.

Aug. 4, 1925.
C. E. DAVIS
1,548,664
SELF PROPELLED VEHICLE
Filed Dec. 29, 1920
5 Sheets-Sheet 5
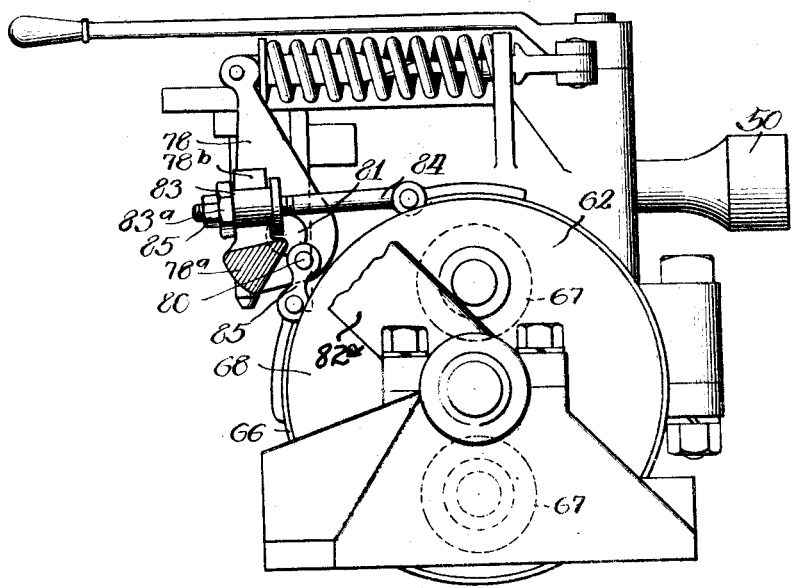
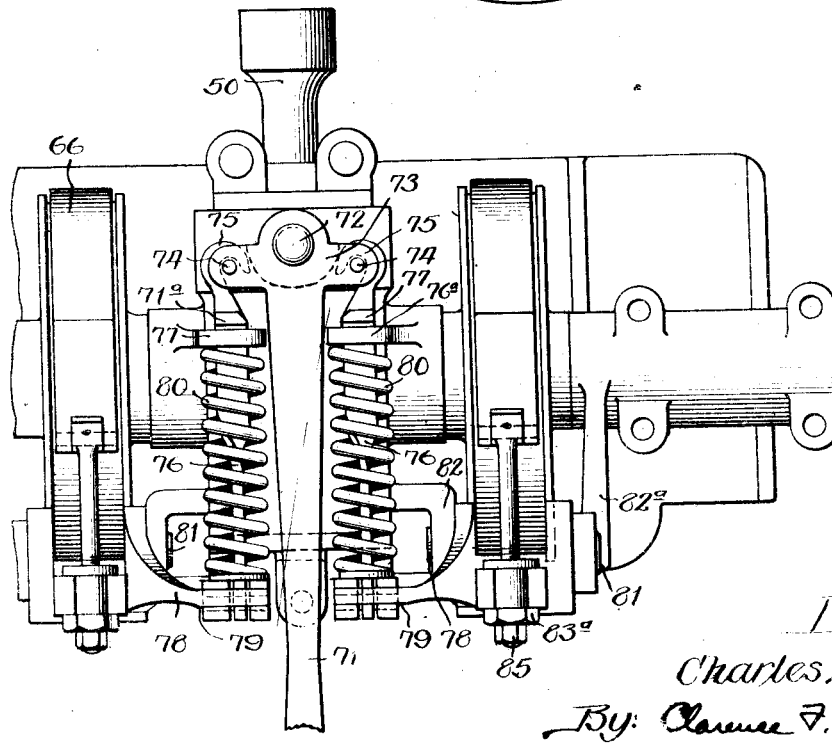
Inventor,
Charles E. Davis,
By: Clarence F. Poole Atty.

Patented Aug. 4, 1925

1,548,664

UNITED STATES PATENT OFFICE.

CHARLES E. DAVIS, OF CHICAGO, ILLINOIS, ASSIGNOR TO GOODMAN MANUFACTURING COMPANY, OF CHICAGO, ILLINOIS, A CORPORATION OF ILLINOIS.

SELF-PROPELLED VEHICLE.

Application filed December 29, 1920. Serial No. 433,757.

*To all whom it may concern:*

Be it known that I, CHARLES E. DAVIS, a citizen of the United States, residing at Chicago, in the county of Cook and State of Illinois, have invented an Improvement in Self-Propelled Vehicles, of which the following is a specification.

This invention relates to improvements in self-propelled vehicles or trucks and more particularly to self-propelled trucks adapted for transporting coal cutting mining machines, although not necessarily restricted to this use.

One object of this invention is to provide a vehicle or truck which can be operated either on rails or on the ground. To this end, I provide an improved construction of driving and supporting mechanism including a wheeled support and a continuous tread which may be moved into and out of operative position. A further object of this invention is to provide means for steering the vehicle when operating upon the continuous tread.

Details of construction of the steering mechanism disclosed herein are described and specifically claimed in a divisional application, Serial No. 434,646, filed Jan. 5, 1921.

The invention consists in the combination, construction and arrangement of parts as will hereinafter be described in connection with the accompanying drawings, in which Figure 1 is a top plan view of a truck for a mining machine, embodying the several features of the present invention.

Figure 2 is a view in side elevation of the truck.

Figure 3 is a detail view in perspective of the side frame for supporting the truck axles and the continuous tread associated therewith.

Figure 4 is a detail view in perspective of the lower supporting member for the continuous tread.

Figure 5 is a detail view in perspective of the upper supporting member for the continuous tread.

Figure 6 is a detail view in perspective of two guide-keys associated with the side frame and supporting shoes.

Figure 10 is an enlarged rear view of the driving and steering mechanism showing a portion thereof in section.

Figure 11 is a side view of the driving and steering mechanism drawn to the same scale as Fig. 10.

Figure 12 is a fragmentary top plan view of the driving and steering mechanism drawn to the same scale as Figures 10 and 11.

Figure 9:
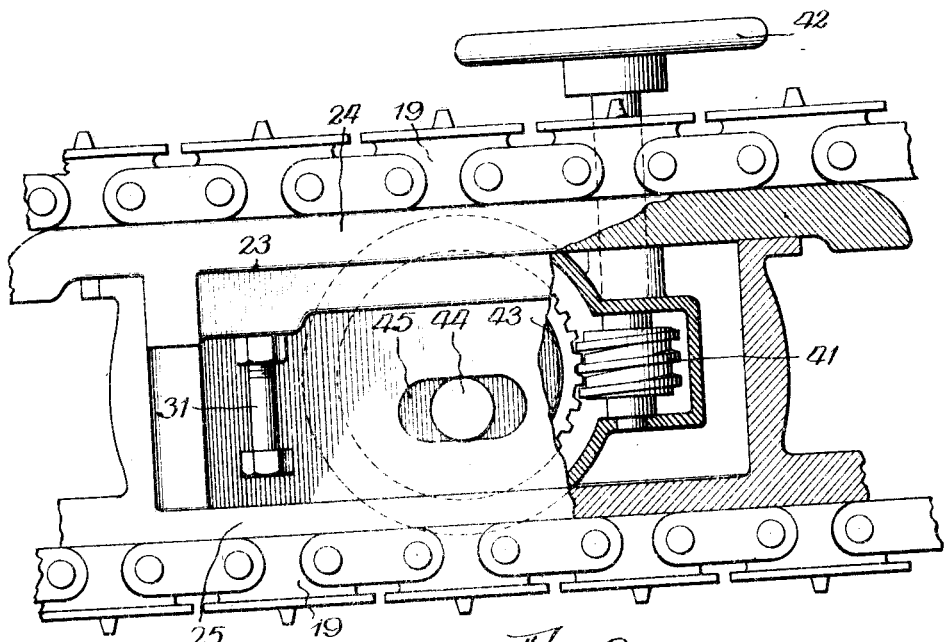
Figure 9 is an enlarged fragmentary view showing a modified form of mechanism for adjusting the height of the tread supporting member.

In the drawings, I have illustrated my invention as applied to a truck for transporting a mining machine from one portion of the mine to another. The main entries or galleries are usually provided with tracks over which a truck may be readily transported, but in many instances the mining machine must be carried beyond the end of the tracks up to the working face, as for instance in mines where it is not deemed advisable or economical to extend temporary tracks into the mine rooms. In such cases it has heretofore been necessary to unload the mining machine from the truck at the entrance to the room and drag it bodily to the working face either by means of crow bars or the like or by power driven draft ropes carried by the machine and anchored at a distance therefrom.

In the embodiment of the present invention, a mining machine truck is provided with a continuous tread in addition to the usual flanged track wheels so that it may be operated over a track in the usual manner, but when it is desired to transport the machine beyond the track, the continuous tread may be lowered into position to support and drive the truck and machine over the ground. I also provide an improved means for steering the truck while it is being operated on the continuous tread so that it may be guided and turned at will to unload the mining machine at the desired point, and to return the truck and mining machine to the track.

Referring now in detail to the drawings, a mining machine truck indicated at 10 is provided with a body portion 11 for carrying a load, and supporting frames 12, 12 attached to each side of said body portion. Said supporting frames are preferably formed of a single casting as shown in Figure 3 and have bearing members 13, 13 at each end thereof for wheel axles 14, 14. Suitable flanged wheels 15, 15 and 16, 16 are loosely mounted on the axles 14, 14. Sprockets 17 and 18 are associated with each wheel 15 and 16 on the outside thereof and rigidly connected therewith. A continuous tread 19 comprising tread members 20, 20 and links 21, 21, of any suitable pattern, is trained over the sprockets 17 and 18, said continuous tread comprising an endless chain forming an operative connection between the wheels 15 and 16, and also providing an operative contact with the ground when the truck is operated thereon. Means for raising and lowering the continuous tread formed by the lower surface of the continuous tread 19 comprises a vertically movable frame 22. (See Figure 2.)

Referring now to Figures 4 and 5, it will be seen that the frame 22 comprises a lower tread supporting member 23 and an upper tread supporting member 24. The said lower supporting member comprises a base plate 25 extending between the sprockets 17 and 18 and forming a bearing member for the rear face of the endless chain 19. The ends of said base plate 25 are curved upwardly and are provided with suitable slots 26, 26 through which the ends of the sprocket wheels 17 and 18 may move. The supporting member 23 is also provided with a top plate 27 of shorter length than base plate 25 and spaced from the latter by means of vertical supporting walls 28, 28. The upper tread supporting member 24 is adapted to fit over said top plate 27 and is held in vertical relation therewith by means of suitable lugs 29, 29 which register with slots 30, 30 formed in the top plate 27. Means are provided for adjusting the distance between the upper supporting member 24 and top plate 27 which means comprises a pair of set screws 31, 31 extending through the said top plate and provided with lock nuts 32, 32. By means of the screw adjustment just described, it will be seen that the tension of the continuous tread will be controlled as desired.

The tread supporting member 22, comprising upper and lower shoe members 23 and 24, is mounted as a unit on the frame member 12 so as to be vertically movable thereon. A preferred method of mounting comprises a pair of oppositely disposed slots 33, 33 formed in the frame member 12, said slots registering with vertically disposed slots 34, 34 formed in the side walls 28, 28 of the supporting member 23. A pair of rectangularly shaped pins 35, 35, (see Figure 6), are inserted in the slots 33 and 34 to keep the same in alignment, although affording vertical relative movement between the frame 12 and the support 22.

The movement of the support 22 may be controlled by various means, as for instance an eccentric cam block 36 pivotally mounted in a bearing 37 on the frame member 12 as shown in Figure 3. Said cam member is inserted between the base plate 25 and the top plate 27 and cooperates therewith when rotated to raise and lower the entire support 22 so as to move the continuous tread into and out of engagement with the ground as desired. Said cam block 36 may be turned by any suitable means as for instance a crank, having a rectangular end piece adapted to fit in a socket 40.

A modified construction of the means for controlling the height of the continuous tread is illustrated in Figure 9, and comprises a worm 41 operated by suitable means such as a hand-wheel 42 and engaging a worm wheel 43 having a laterally extending pin 44 extending eccentrically therefrom and engaging in a slot 45 carried by the lower member 23.

Referring now to the driving and steering mechanism, power for operating the truck may be derived from any suitable source such as a motor carried by the truck. In the embodiment illustrated, I have shown an arrangement whereby the motor of a mining machine may be utilized for this purpose. This arrangement comprises a rotatable coupling link 50 which is adapted to be coupled with a suitable motor driven shaft on the mining machine 51 when the machine is loaded in place on the truck, as shown in dotted lines in Figure 2. Said coupling link is operatively connected with a worm gear 52 keyed to a sleeve 53 which sleeve is in turn keyed to a pair of shafts 54, 54 arranged end to end within said sleeve. (See Figure 10.) Said sleeve is journaled on both sides of the gear 52 in a support 55 mounted on the body 11 of the truck. A bearing sleeve 53ª is interposed between the sleeve 53 and support 55. Each of the rear wheels 15, 15 are connected through a chain 38 and wheel sprocket 39 to driving sprockets 56, 56 mounted on opposite sides of the frame.

The driving connection from the worm gear 52 to each of the sprockets 56, 56 are similar in construction so that the description of one driving connection will serve for both. Attached to one of the shafts 54, 54, in Figure 10, is a pinion 57. A second pinion 58 is located adjacent said first named pinion and carried on a shaft 59 mounted in a suitable support 60 so as to rotate in the same axis with the shaft 54. Said pinions 57 and 58 preferably have different pitch diameters to afford a gear reduction at this point. Driving sprocket 56 is keyed to the outer end of the shaft 59. A bearing sleeve 61 is provided for said shaft 59 as shown. A hollow casing 62 is mounted over the pinions 57 and 58 and rotates loosely on the bearings 53ª and 61 as shown. Said casing comprises two end plates 63 and 64, the former having an annular periphery 65 adapted to have frictional contact with a friction band 66 for controlling the rotation of said casing, as will hereinafter more fully appear. Inside of said casing is mounted a plurality of gear pinions 67, 67, each rotatably mounted on a stud 68 carried in the end plates 63 and 64 of the casing 62. Each of said gear pinions is provided with two geared peripheries 69 and 70 having different pitch diameters adapted to mesh with the pinions 57 and 58 respectively. By means of the arrangement just described, the shaft 59 and sprocket 56 carried thereby, can be driven at various speeds with respect to the worm gear 52 by varying the degree of frictional engagement of the friction band 66 on the casing 62. This is explained as follows. If the friction band 66 is tightened so as to maintain the casing 62 against rotation, the pinion 57 drives the pinion 67 which in turn drives the pinion 58 and shaft 59. A certain gear reduction is afforded by the difference in pitch diameters of the several gears, as already described, but there is no relative variation in speed between the shafts 54 and 59 as long as the casing 62 is restrained from rotation. It will be noted, however, that there is a constant torque exerted upon the casing 62, and if the friction band 66 is released sufficiently, said casing will rotate in the direction opposite to the direction of rotation of the gear 57, thereby causing a proportional decrease in the speed of rotation of the shaft 59 and the sprocket 56. It will now be clear that by variation in the tension of the friction band 66, the variation in relative speeds of the worm gear 52 and the driving sprockets 56, 56 may be obtained as desired.

The mechanism for controlling the tension of the two friction bands 66, 66 comprises a hand lever 71 extending rearwardly from the end of the truck and pivoted on a pin 72. Said lever is provided with a cross-arm 73 having vertically disposed pins 74, 74 on the opposite sides of said lever, said pins being engaged by hooked end members 75, 75 of the tie-rods 76, 76 extending rearwardly and parallel with each other as shown. Said tie-rods extend through suitable lugs 77, 77 on the opposite sides of the frame and are attached at their rear ends to a pair of upwardly extending lever arms 78, 78 by means of suitable pins 79, 79. A pair of compression springs 80, 80 is mounted about the tie-rods 76, 76 and each is interposed between the respective lugs 77 and the end of the lever arms 78, 78, tending to force said levers rearwardly. Each of the lever arms 78 comprises an L-shaped extension 78ª having two upwardly extending portions 78ᵇ, 78ᵇ forming a yoke adapted to receive a spool shaped stud 83 attached to one end of the friction band 66. Said stud has threaded engagement with a link 84 extending therethrough and has a hexagonal head 83ª so that it may be rotated in the yoke to provide necessary adjustment for the tension of the friction band. A lock nut 85 is provided adjacent the stud head 83ª. The opposite end 85 of the friction band 66 is also attached to the lever 78 by means of a pin 86. The lever arm is pivoted at both sides on pins 81, 81, carried in suitable brackets 82, 82ª. The stud 83 and pin 86 are so arranged with respect to the pivot pins 81, 81, of the operating lever 78 that the rearward movement of the latter tightens the friction band 66 about the casing 62, and as before described, each of the compression springs 80, 80 forces the levers 78, 78 rearwardly to provide a tension on said friction band. The springs 80 provide sufficient tension to normally maintain the casing against rotation, thereby affording a uniform driving speed to both of the sprockets 56, 56. It will be seen, however, that if the tension on either of the springs 80 is reduced, its respective casing may slip in the friction band, thereby reducing the speed of the driving sprocket 56 on that side of the machine. In the present construction, the tension on springs 80, 80 is controlled by means of the hand lever 71, which may be turned in one direction or the other to release the tension of the spring on the side toward which the lever is deflected. The arrangement is such, however, that the deflection of the hand lever 71 in one direction affects only the movement of the lever which is released, inasmuch as each of the tie-rods 76, 76 is provided with a shoulder 76ª adapted to engage the adjacent stud 77, to limit the rearward movement of the tie-rods. The hooked end 75 of each rod is loosely engaged on the pins 74, so that while one of the tie-rods is being moved forwardly by the deflection of the hand lever 71 to the right, (Fig. 10), the pin 74 on the opposite, or left end of the cross lever 73 disengages itself from its respective hook 75, and the tension on the left hand friction band remains practically unaffected by the movement of the lever. From the above description of the driving and steering mechanism, it will now be clear that the relative speeds of the sprockets 56, 56 may be varied so as to drive the continuous tread at different speeds and cause a change in the course of direction of the truck as desired. It is obvious, however, that it is only necessary to steer the truck in this manner when it is being operated on the continuous tread, since no steering is necessary when the truck is mounted on the tracks. Adjustment of the tension of the friction band 66, 66 may be accomplished by means of the nut 85 so as to maintain the driving speed on both driving sprockets 56, 56 substantially equal when the steering lever 71 is in its central position. Said lever will normally be held in this position by the opposing action of the springs 80, 80. Whenever it is desired to release the friction band quickly, as for instance when the truck is to be towed or pushed along the track, the stud 83 can be quickly raised out of its notched engagement with the lever 78.

Figure 7:
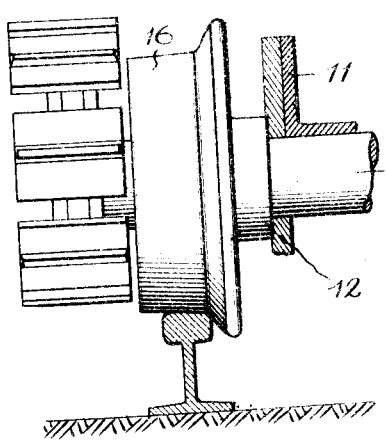
Figures 7 and 8 are fragmentary views illustrating the use of the truck on the rails and on the ground, showing the continuous tread in raised and lowered positions in the respective figures.
Figure 8:
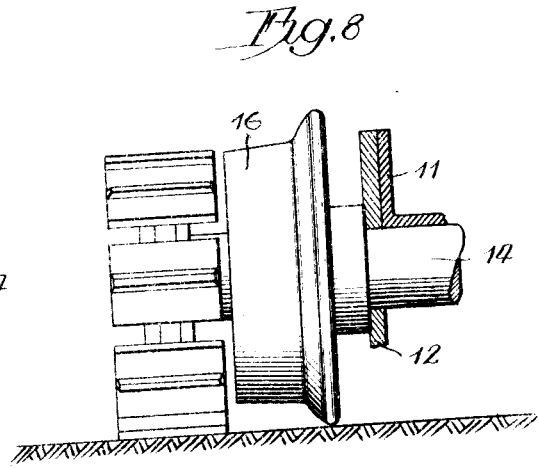

Having thus described the various features of the embodiment of my invention, it will now be clear that I have provided a combination wheel and continuous tread vehicle which is suitable for many purposes, particularly for the purpose illustrated herein, namely, that of transporting a mining machine either on the track or on the ground. The wheels and continuous treads may be moved vertically with respect to each other, whereby the truck may be wholly supported by either, as desired. In the preferred construction shown, the wheels are mounted rigid with respect to the frame, and the tread supporting member 22 is movable, but it is obvious that the same results will be obtained if the tread supporting member is rigidly mounted on the frame, and the wheels are movably mounted with respect thereto. While operating the machine over a track, the continuous tread is raised above the level of the track as shown in Figure 7 so that the truck can easily pass over crossings, frogs or the like. While operating on a continuous tread, the machine can be steered as desired.

The continuous tread chain operates as a driving connection between the forward and rear wheels while operating over the track.

While I have described my invention as applied to a truck for mining machines, it is obvious that the several features of invention herein disclosed can also be applied to other types of vehicles. For instance, the driving and steering mechanism herein disclosed is not necessarily limited to the continuous tread vehicle, but can be applied to wheeled vehicles such as tractors for steering the same. I do not, therefore, wish to be understood as limiting myself to the particular application of the various features as illustrated herein, nor do I wish to be limited to the specific construction shown, excepting as limited in the appended claims.

I claim as my invention:

1. In a vehicle, in combination with a frame, a pair of wheels adapted to normally support said frame, driving mechanism associated with one of said wheels, sprockets operatively connected with each of said wheels, a continuous tread mechanism comprising an endless chain engaging said sprockets and affording a driving connection therebetween, a support interposed between the wheels and engaging the upper and lower flights of said tread mechanism, and means for moving said support vertically including a cam member rotatably mounted on the frame and engaging said support.

2. In a vehicle, in combination with a frame, a pair of wheels adapted to normally support said frame, driving mechanism associated with one of said wheels, sprockets operatively connected with each of said wheels, a continuous tread mechanism comprising an endless chain engaging said sprockets and affording a driving connection therebetween, a support interposed between the wheels and engaging the upper and lower flights of said tread mechanism, means for varying the distance between said upper and lower flights, and means for moving said support vertically.

3. In a vehicle, in combination with a frame, two supporting members associated with said frame and movable vertically with respect to each other, one of said supporting members having a pair of laterally spaced wheels mounted thereon, the second supporting member interposed between said wheels, and having a continuous tread mechanism mounted thereon, and means for driving said wheels and tread mechanism including a pair of sprockets operatively engaged with each of said wheels, and with said tread mechanism.

4. In a vehicle, in combination with a frame, two supporting members associated with said frame and movable vertically with respect to each other, one of said supporting members having a pair of laterally spaced wheels mounted thereon, the second member interposed between said wheels and adapted to support a continuous tread mechanism, said last named support including a pair of oppositely disposed bearing members adapted to engage the upper and lower flights of said tread mechanism, and means for adjusting the distance between said bearing members.

5. In a vehicle, in combination with a frame, two supporting members associated with said frame and movable vertically with respect to each other, one of said supporting members having a pair of laterally spaced wheels mounted thereon, the second member interposed between said wheels and adapted to support a continuous tread mechanism, said last named support including a pair of oppositely disposed bearing members adapted to engage the upper and lower flights of said tread mechanism, guide means for maintaining said bearing members in alignment with each other, and means for adjusting the distance between said bearing members.

6. In a vehicle, in combination with a frame, two supporting members associated with said frame and movable vertically with respect to each other, one of said supporting members having a pair of laterally spaced wheels mounted thereon, the second supporting member interposed between said wheels, and having a continuous tread mechanism mounted thereon, and means for driving said wheels and tread mechanism including a pair of sprockets carried by each of said wheels and engaging said tread mechanism.

7. In a vehicle, in combination with a frame, a pair of load-supporting wheels, driving mechanism associated with one of said wheels, sprockets operatively connected with each of said wheels, a continuous tread mechanism spaced laterally from said wheels and affording a driving connection between both of said sprockets, supporting means for said tread mechanism intermediate said sprockets, and means for moving said tread supporting means vertically with respect to said wheels.

8. In a vehicle, in combination with a frame, a pair of wheels adapted to normally support said frame, sprockets operatively connected with each of said wheels, a continuous tread mechanism spaced laterally from said wheels and comprising an endless chain operatively engaging said sprockets and affording a driving connection therebetween, and means for moving a portion of said tread intermediate said wheels vertically.

Signed at Chicago, Illinois, this 23rd day of December, 1920.

CHARLES E. DAVIS.